United States Patent Office 3,408,302
Patented Oct. 29, 1968

3,408,302
THORIA/TERBIUM FLUORIDE LUMINOPHORS
Hans J. Borchardt, Wilmington, Del., assignor to E. I. du Pont de Nemours and Company, Wilmington, Del., a corporation of Delaware
Filed May 24, 1965, Ser. No. 458,160
9 Claims. (Cl. 252—301.1)

ABSTRACT OF THE DISCLOSURE

Luminescent compositions suitable for fluorescent lights and X-ray or cathode ray screens can be made by heating the oxides, fluorides or oxyfluorides of thorium and terbium to give a ratio of terbium to total cations of 0.0005 and 0.05, and a ratio of fluoride ions to total cations of 0.01 and 0.2, and a ratio of fluoride ions to terbium between 0.5 and 100, to a temperature greater than 900° C. in an inert atmosphere.

---

Figure 1:
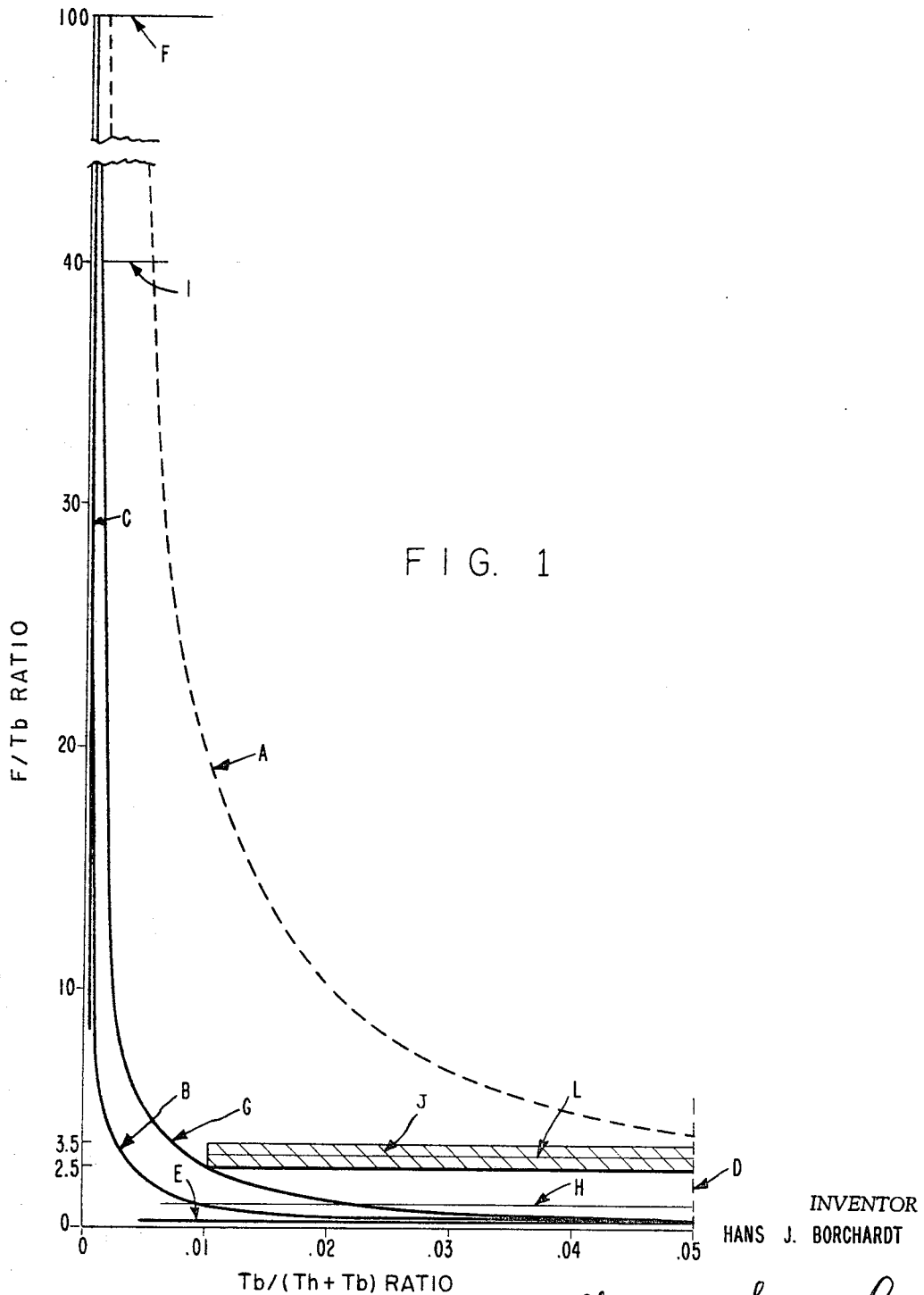
Figure 2:
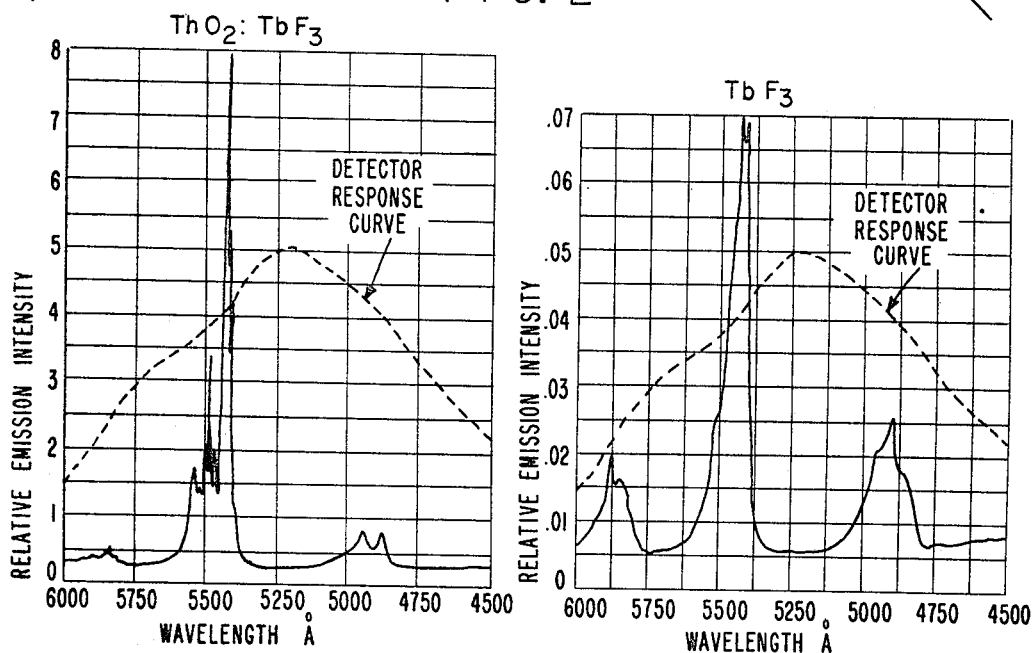
Figure 3:
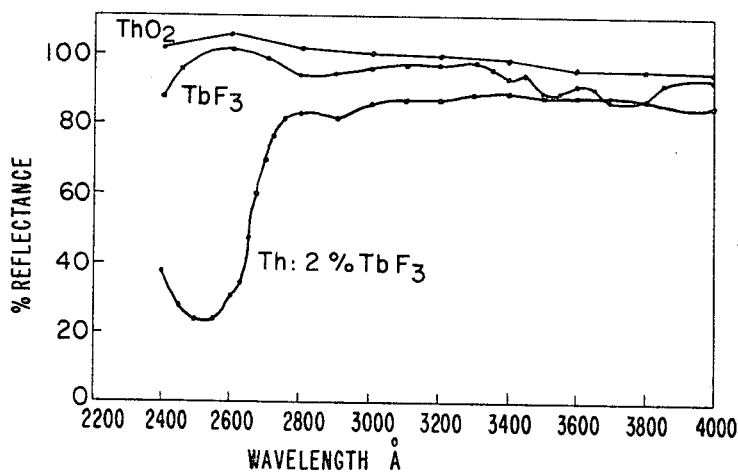

The present invention relates to novel luminescent compositions, and to a process for the preparation of these compositions. More particularly, the present invention relates to luminescent compositions having a heavy metal oxide as a host material and containing trivalent terbium cations and fluoride anions.

Luminescent compositions are generally composed of a host material, such as a metal oxide, and an activator, which may be an impurity atom. In one type of luminescence mechanism, energy, provided by, e.g. X-rays, is absorbed by the host material and transferred to the activator from which the luminescent emission occurs. In certain applications, particularly those involving emission in response to X-ray excitation, it is desirable that the host material include a substantial proportion of heavy atoms since such atoms absorb X-ray energy more effectively than lighter atoms. Among heavy elements which may be employed are lead, bismuth, thorium, and uranium. It is also desirable that the luminescent composition be substantially free of color, for color in the material not only detracts from its own luminescence but may affect the luminescence of other phosphors with which it is mixed in particular applications.

The present invention provides crystalline, substantially colorless compositions which exhibit highly efficient luminescence on exposure to X-rays, and also on ultraviolet and cathode-ray excitation. These luminescent compositions have the fluorite crystal structure and consist essentially of thorium cations, terbium activator cations, oxygen anions, and fluoride anions, the atomic ratio of terbium ions to total cations [Tb/(Tb+Th)] being at least 0.0005, the ratio of fluoride ions to total cations $$[F/(Tb+Th)]$$

being at least 0.01, the ratio of fluoride ions to terbium ions (F/Tb) being in the range of 0.5–100, and oxygen anions being present in an amount sufficient to provide over-all electrical neutrality, i.e., to insure that the total negative charges of the anions are sufficient to counterbalance the total positive charges of the cations.

The desired proportions of thorium, terbium, oxygen, and fluorine are readily obtained by heating mixtures of thorium dioxide, thorium tetrafluoride, terbium trifluoride, and terbium sesquioxide in powder form and in said proportions. Oxyfluorides of thorium and terbium such as $ThOF_2$ and $TbOF$, can also be employed. As seen from the composition limitations, the mixture to be reacted can be any two or more of the immediately above compounds as long as the mixture contains Th and Tb cations and F and O anions.

Thorium dioxide of excellent quality for use in the process of this invention can be prepared by ignition of thorium oxalate at 650–700° C. for five hours. Terbium trifluoride can be obtained by precipitation with hydrofluoric acid from aqueous terbium nitrate solution. Alternatively, commercially available products can be employed. Whatever the source, thorium dioxide which has been fired at high temperatures is to be avoided since it is relatively unreactive.

The reactants should be thoroughly mixed, and preferably, should be free of moisture. The presence of moisture is especially undesirable in products containing a low proportion of fluoride. Freedom from moisture can be assured by thoroughly drying the reactants and thereafter handling them in an inert, moisture-free atmosphere.

For conversion to the luminescent composition, the reactants are intimately mixed in the proportions selected and heated to a temperature above 900° C. and usually in the range of 900–1600° C. The heating may be carried out in a sealed vessel to prevent loss of fluoride and may be conducted in stages if desired. An inert atmosphere, such as an atmosphere of nitrogen or argon, is preferably employed during the heating period.

The process is normally conducted under a small super-atmospheric pressure ranging up to about 20 atmospheres. Higher pressures can be employed.

The novel compositions of the invention are described more fully immediately below, and in connection with the drawings, wherein:

FIGURE I is a graphical representation of certain composition ranges,

FIGURE II depicts portions of the luminescent emission spectra of a composition of this invention and of terbium trifluoride, and FIGURE III shows a comparison of ultraviolet diffuse reflectance intensities for a composition of this invention, terbium trifluoride, and thorium dioxide.

At Tb/(Th+Tb) ratios of up to about 0.05, only the single fluorite crystal phase is obtained. At ratios above 0.05, efficient phosphors are also produced; however, such compositions contain other crystal structures or phases beside the fluorite structure because the solubility limit (consequently the phase boundary of the fluorite phase) of $TbF_3$ in $ThO_2$ is about 5 atom percent, i.e., $$Tb/(Th+Tb)=0.05$$

The exact proportion of $TbF_3$ at which this boundary occurs depends upon the temperature and F/Tb ratio and, of course, is subject to the usual uncertainties in experimentally determined values. The preferred compositions of this invention are the single phase compositions up to and including the phase boundary composition, the compositions beyond the phase boundary being mixtures of these compositions with other material.

When the fluoride ion content is increased to obtain F/Tb ratios above 3, for example, by adding ThF$_4$ as a third ingredient in the reaction mixture, the preferred single fluorite crystal phase will be limited by the solubility of ThF$_4$ in ThO$_2$, which is also approximately 5 atom percent. This phase boundary can be defined as a ratio of fluoride ions to total cations [F/(Th+Tb)] of about 0.2. Compositions containing higher proportions of fluoride are mixtures of the preferred compositions with another phase. Certain of the mixed phase compositions occurring beyond this boundary, particularly those in which the terbium to total cation ratio is greater than 0.01, are also efficient phosphors. The exact ThF$_4$ content at which the ThF$_4$ phase boundary occurs is determined by factors of the type enumerated above in the discussion of the TbF$_3$ phase boundary.

The preferred single crystal phase compositions of this invention can also be described in terms of the graph in FIGURE I. In FIGURE I, Curves A and B represent the equation:

$$\frac{F}{Tb} \cdot \frac{Tb}{Tb+Th} = K$$

for values of K of 0.2 and 0.01, respectively, the former value being determined by the solubility of thorium tetrafluoride in thorium dioxide as set forth above and the latter by the luminescent efficiency of the compositions. Line C represents the lower limit of terbium content for efficient luminescence and corresponds to $$Tb/(Tb+Th) = 0.0005$$

the upper limit is defined by the maximum solubility of TbF$_3$ in ThO$_2$ as indicated at $$D[Tb/(Tb+Th) = 0.05]$$

The limits of the F/Tb ratio are indicated by lines E (F/Tb=0.5) and F (F/Tb=100). For best luminescent efficiency, it is preferred that K have a value of at least 0.025 (line G), and that F/Tb be greater than 1 (line H) and less than 40 (line I). The best compositions have a fluoride-terbium ratio in the range of 2.5–3.5 and contain at least 1% terbium (area J). Certain of the preferred compositions can be represented by the formula $$(ThO_2)_{1-x}(TbF_3)_x$$

wherein $x$ is .01–0.05. In the graph of FIGURE I these latter compositions are represented by the horizontal line (L) in area J. While proportions within the range defined above give best results, it will be appreciated that larger proportions of terbium and fluoride can be employed, for example, proportions defined by the above equation when K is equal to 0.6, which give efficient luminescent compositions, but that such products consist of mixtures of the compositions of this invention with other phases as set forth above.

The invention is illustrated in greater detail in the following examples in which quantities of reactants are given in parts by weight.

EXAMPLE I

This example illustrates the preparation of a luminescent composition corresponding to (ThO$_2$)$_{0.98}$(TbF$_3$)$_{0.02}$. Thorium dioxide (2.59 g.) and terbium trifluoride (0.04 g.), both in powder form, are thoroughly mixed and the mixture is placed in a thin-walled platinum tube ⅜″ in diameter and 3″ long which is closed at one end. The platinum tube is hermetically sealed and placed in a pressure vessel. Pressure and temperature are raised to 1000° C. and 150 p.s.i. After 24 hours, the reactor is cooled, pressure relieved, and the product removed from the platinum tube. The product exhibits a bright green luminescence on exposure to short wave length ultraviolet, X-ray, or cathode-ray excitation. The emission spectrum, uncorrected for detector response, which is produced on excitation by 2537 A. radiation, is shown in FIGURE II.

A portion of the product was pressed into a ¼″ diameter hole in a piece of fiberboard ⅛″ thick and was retained in the hole with a transparent adhesive film placed over each side. A sample of commercial X-ray intensifier screen phosphor, CaWO$_4$, was pressed into a similar hole. A piece of panchromatic photographic film was placed upon the fiberboard covering both holes; board and film were placed in a medical X-ray film cassette containing no fluorescent screen. The whole assembly was exposed to X-rays from a tungsten target tube operated at 70 kv., 100 ma., using a ½₀ second exposure. Upon development of the exposed film, dark spots on the film, corresponding to light emitted from the phosphors, were observed. Film density was read, and the spot corresponding to the commercial X-ray phosphor was found to have a density of 0.99, while the spot corresponding to the terbium fluoride-thoria phosphor exhibited a density of 1.30. From a calibration curve for the film relating film density with total light emission, but uncorrected for spectral sensitivity of the film, it was determined from the above densities that the emission from the terbium fluoride-thoria phosphor was twice that of the commercial X-ray intensifier screen phosphor. Upon correction to allow for the fact that the film was more sensitive to the blue emission of CaWO$_4$ than to the green emission of the terbium fluoride-thoria phosphor, it was found that the actual emission from the terbium fluoride-thoria phosphor was 2.8 times the emission from the commercial phosphor. In other words, the efficiency of the terbium fluoride-thoria phosphor in converting X-ray energy to light is 280% that of the commercial phosphor. This terbium fluoride-thoria phosphor was used as a standard for evaluating the efficiency of other phosphors described below.

Samples of the powdered terbium fluoride-thorium dioxide mixture described above were also converted to luminescent materials using the general procedure as above but with maximum heating temperatures of 1100° C., 1300° C., and 1500° C. These temperatures were maintained for 27 hours. The relative luminescent efficiency of the products so prepared was determined by comparing the relative emission intensity on exposure to ultraviolet light having a wave length of 2630 A. with that of the product made of 1000° C. (taken as 100%). The products prepared at 1100° C., 1300° C., and 1500° C. had relative emission intensities of 122, 146, and 172%, respectively.

EXAMPLES II–IX

These examples are summarized in Table I. The preparations were carried out according to the procedure described in Example I, except that a maximum pressure of 225 p.s.i. was employed in certain cases, as indicated in the table. The starting materials were thorium dioxide and terbium fluoride which were employed in the proportions indicated. The table also includes the relative luminescent efficiency of the products on X-ray excitation compared with the calcium tungstate phosphor referred to above, and on ultraviolet excitation relative to the product of Example I prepared at 1000° C. For the compositions of this invention, relative luminescent efficiency on UV excitation parallels, and can be used as an indication of, relative efficiency on X-ray excitation. Fluorine analyses on certain products and the fluorine-terbium ratio calculated therefrom on the assumption that all terbium charged enters the luminescent composition are given.

TABLE I.—TbF₃-ACTIVATED THORIA

| Example Number [1] | $(ThO_2)_{1-x}(TbF_3)_x$ Value of $x$ | Maximum Pressure [2] (p.s.i.) | Analytical Data Percent F | Analytical Data F/Tb Ratio | Relative Luminescent Efficiency [3] X-ray (Percent, Corrected) | Relative Luminescent Efficiency [3] UV (Percent) |
|---|---|---|---|---|---|---|
| II | 0.01 | 225 | | | 210 | 66 |
| III | 0.005 | 150 | | | | 25 |
| IV | 0.05 | 225 | 0.88 | 2.3 | 220 | 94 |
| V | 0.10 | 225 | 1.99 | 2.7 | 170 | 75 |
| VI | 0.20 | (⁴) | | | | 83 |
| VII | 0.30 | 150 | 5.18 | 2.25 | | 87 |
| VIII | 0.40 | 150 | | | | 89 |
| IX | 0.50 | 150 | | | | 93 |

[1] The products of Examples II–IV had the fluorite crystal structure; those of Examples V–IX were mixtures of the fluorite structure with other crystal structures.
[2] Process of Example I using maximum temperature of 1,000° C. and maximum pressure as noted; heating period at 1,000° C. in Example VI was 20 hours.
[3] Determined by methods described in Example I.
[4] Autogenous.

EXAMPLES X–XVIII

These examples were carried out using the procedure of Example I with thorium dioxide, thorium tetrafluoride, and terbium trifluoride as starting materials. Conversion to the luminescent composition was accomplished by heating for 24 hours at 1000° C. under pressure as described in Example I. The proportion of terbium and the fluorine-terbium ratio for each example are indicated in Table II. The table also shows the relative luminescent efficiency of each product compared to that of the product of Example I prepared at 1000° C. Fluorine analyses for certain products are shown and the corresponding fluorine-terbium ratios calculated on the assumption that all terbium charged enters the luminescent phase are included.

TABLE II.—ThO₂:Tb, F LUMINESCENT MATERIALS

| Example Number [1] | Tb (atom percent) | F/Tb Ratio | Analytical Data Percent F | Analytical Data F/Tb Ratio | Relative Luminescent Efficiency (percent) |
|---|---|---|---|---|---|
| X [2] | 2 | 2 | | | 32 |
| XI | 0.5 | 19 | | | 43 |
| XII | 0.75 | 13.7 | | | 50 |
| XIII | 0.25 | 35 | 0.10 | 5.6 | 57 |
| XIV | 2.0 | 7 | 0.46 | 3.0 | 52 |
| XV | 0.5 | 35 | | | 25 |
| XVI | 2.0 | 15 | 0.94 | 6.5 | 53 |
| XVII | 1.0 | 43 | | | 25 |
| XVIII | 4.0 | 13 | | | 70 |

[1] Process of Example I using maximum temperature of 1,000° C. and maximum pressure of 150 p.s.i. The products of Examples X–XV were wholly of the fluorite crystal structure; those of Examples XVI-VIII were mixtures of the fluorite with other crystal structures.
[2] Starting materials were ThO₂, Tb₂O₃ and TbF₃; autogenous pressure; heating period at 1,000° C., 20 hours.

The products of this invention are distinguished from mixtures of the reactants in a number of characteristics as indicated by measurements of emission intensity, emission spectrum, and ultraviolet absorption. The relative emission intensity of terbium trifluoride on exposure to ultraviolet light of wave length 2630 A., measured according to the procedure described above in Example I, is approximately 1% of that of the product of Example I prepared at 1000° C. Thorium dioxide does not fluoresce at all under these conditions (intensity, zero), and a physical mixture of terbium trifluoride and thorium dioxide therefore does not exhibit an emission intensity of more than 1%. In comparison, the products prepared by the process of the present invention in which terbium fluoride and thorium dioxide are reacted at high temperature exhibit emission intensities of 100% and higher.

The fluorescent emission spectrum of terbium fluoride-thoria luminescent compositions also exhibits characteristics different from the emission spectrum of terbium trifluoride, thus demonstrating the TB⁺³ cation has different surroundings in the terbium trifluoride-thoria composition than in terbium trifluoride. Comparative spectra in the range of 4500–6000 A. for the product of Example I (1000° C.) and for TbF₃ are shown in FIGURE II.

Neither thorium dioxide nor terbium trifluoride exhibits appreciable absorption in the ultraviolet region 2500–2650 A. The luminescent compositions of this invention derived from these compounds, however, exhibit a very strong absorption band in this region. This is illustrated in FIGURE III which shows the reflectance of thorium dioxide, terbium trifluoride, and a composition of formula $(ThO_2)_{0.98}(TbF_3)_{0.02}$ over the wave length range 2200–4000 A.

The products of this invention are useful as phosphors for X-ray intensifying screens as illustrated in the examples. The products also luminesce efficiently on excitation by ultraviolet light, such as that originating from a low-pressure mercury discharge (2537 A.), and are useful as the phosphors in fluorescent lights. The materials are also efficiently excited by exposure to cathode rays and can be employed as color components in color television tubes.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A luminescent composition of the fluorite crystal structure consisting essentially of the thorium cations, terbium cations, oxygen anions and fluoride anions, wherein
  (a) the ratio Tb/(Tb+Th) is between about 0.0005 and 0.05,
  (b) the ratio F/(Tb+Th) is between about 0.01 and 0.2,
  (c) the ratio F/Tb is between about 0.5 and 100, and
  (d) the oxygen anions are present in an amount sufficient to provide over-all electrical neutrality in the composition.

2. A luminescent composition of the fluorite crystal structure consisting essentially of thorium cations, terbium cations, oxygen anions and fluoride anions, wherein
  (a) the ratio Tb/(Tb+Th) is not greater than 0.05,
  (b) the ratio F/(Tb+Th) is between 0.025 and 0.2,
  (c) the ratio F/Tb is between about 1 and 40, and
  (d) the oxygen anions are present in an amount sufficient to provide over-all electrical neutrality in the composition.

3. A luminescent composition of the fluorite crystal structure consisting essentially of thorium cations, terbium cations, oxygen anions and fluoride anions, wherein
  (a) the ratio F/Tb is between 2.5 and 3.5,
  (b) the ratio Tb/(Th+Tb) is between 0.01 and 0.05, and
  (c) the oxygen anions are present in an amount sufficient to provide over-all electrical neutrality in the composition.

4. A luminescent composition of the fluorite crystal structure represented by the formula $(ThO_2)_{1-x}(TbF_3)_x$ wherein $x$ is between 0.01 and 0.05.

5. $(ThO_2)_{0.98}(TbF_3)_{0.02}$.
6. $(ThO_2)_{0.99}(TbF_3)_{0.01}$.
7. $(ThO_2)_{0.95}(TbF_3)_{0.05}$.
8. $(ThO_2)_{0.9}(TbF_3)_{0.10}$.

9. Process for preparing a luminescent composition of the fluorite crystal structure consisting essentially of thorium cations, terbium cations, oxygen anions and fluoride anions wherein (a) the ratio $Tb/(Tb+Th)$ is between about 0.0005 and 0.05, (b) the ratio $F/(Tb+Th)$ is between about 0.01 and 0.2, (c) the ratio $F/Tb$ is between about 0.5 and 100, and (d) the oxygen anions are present in an amount sufficient to provide over-all electrical neutrality in the composition, which comprises heating above 900° C. in an inert atmosphere in a sealed vessel at superatmospheric pressure, a mixture of a thorium-containing compound selected from the class consisting of $ThO_2$, $ThF_4$ oxyfluorides of thorium and mixtures thereof, with a terbium-containing compound selected from the class consisting of $TbF_3$, $Tb_2O_3$ and oxyfluorides of terbium, where the ionic ratios of the ionic ratios of the ions in said mixture are within the ranges set forth above.

References Cited

UNITED STATES PATENTS

| | | | |
|---|---|---|---|
| 2,323,284 | 6/1943 | Toorks | 252—301.1 |
| 3,163,610 | 12/1964 | Yocom | 252—301.1 X |
| 3,250,722 | 5/1966 | Borchardt | 252—301.4 X |

OTHER REFERENCES

A Textbook of Inorganic Chemistry, J. N. Friend, IV, 1917, page 303.

Some Aspects of the Luminescence of Solids, F. A. Kroger, 1948, page 297.

CARL D. QUARFORTH, *Primary Examiner.*

M. J. SCOLNICK, *Assistant Examiner.*